US006839631B1

(12) United States Patent
Pemble et al.

(10) Patent No.: US 6,839,631 B1
(45) Date of Patent: Jan. 4, 2005

(54) SPACE BASED AUGMENTATION SYSTEM WITH HIERARCHY FOR DETERMINING GEOGRAPHICAL CORRECTIONS SOURCE

(75) Inventors: Cliff Pemble, Olathe, KS (US); Clayton E. Barber, Independence, MO (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/029,816

(22) Filed: Dec. 21, 2001

(51) Int. Cl.[7] .......................... G01C 21/26; H04B 7/185
(52) U.S. Cl. ................... 701/214; 701/215; 342/357.02; 342/357.15; 342/358; 455/12.1; 455/13.2
(58) Field of Search .......................... 701/216, 220–221, 701/207, 213, 214, 215; 342/357.02, 357.04, 357.08, 357.09, 357.15, 352, 356, 358, 357.16, 357.01, 357.03, 357.06, 357.12; 455/456.1, 427, 12.1, 13.1–13.3

(56) References Cited

U.S. PATENT DOCUMENTS

| | | | | |
|---|---|---|---|---|
| 5,596,328 A | * | 1/1997 | Stangeland | 342/357.03 |
| 5,610,616 A | * | 3/1997 | Vallot et al. | 342/357.03 |
| 5,621,646 A | | 4/1997 | Enge et al. | 364/449 |
| 5,828,336 A | | 10/1998 | Yunck et al. | 342/357 |
| 6,040,798 A | | 3/2000 | Kinal et al. | 342/357.01 |
| 6,278,402 B1 | * | 8/2001 | Pippin | 342/357.08 |
| 6,323,803 B1 | * | 11/2001 | Jolley et al. | 342/357.03 |
| 6,377,892 B1 | * | 4/2002 | Johnson et al. | 701/213 |
| 6,411,254 B1 | * | 6/2002 | Moeglein et al. | 342/357.01 |
| 6,462,707 B1 | * | 10/2002 | Clark | 342/357.06 |
| 6,469,663 B1 | * | 10/2002 | Whitehead et al. | 342/357.03 |
| 6,529,830 B1 | * | 3/2003 | Eschenbach | 701/215 |
| 6,603,426 B1 | * | 8/2003 | Clark | 342/357.06 |
| 2002/0005802 A1 | * | 1/2002 | Bryant et al. | 342/357.01 |
| 2002/0072378 A1 | * | 6/2002 | Gaal | 455/456 |
| 2002/0120400 A1 | * | 8/2002 | Lin | 701/214 |
| 2002/0198001 A1 | * | 12/2002 | Bajikar | 455/456 |
| 2002/0198657 A1 | * | 12/2002 | Robbins | 701/214 |
| 2003/0067409 A1 | * | 4/2003 | Murphy | 342/357.01 |

OTHER PUBLICATIONS

El–Arini, M., et al., "Evaluation of the GPS Wide–Area Augmentation System (WAAS) Ionospheric Grid Algorithm During the Peak of the Current Solar Cycle", *Proceedings of the 1994 National Technical Meeting: Navigating the Earth and Beyond—San Diego, CA* Jan. 24–26, 1994, pp. 961–968.

El–Arini, M. B., et al., "The FAA Wide Area Differential GPS (WADGPS) Static Ionospheric Experiment", 1993; pp. 485–496.

Walter, T., et al., "Flight Trials of the Wide–Area Augmentation System (WAAS)", *Stanford University*, (Sep. 23, 1994),10 pages.

* cited by examiner

*Primary Examiner*—Jacques H. Louis-Jacques
(74) *Attorney, Agent, or Firm*—Devon A. Rolf

(57) ABSTRACT

Systems, devices and methods are provided for determining the appropriate or desired geographical correction source for SBAS corrections. One aspect provided herein is a method. According to one method embodiment, a Space Based Augmentation System (SBAS) correction message is received from a selected SBAS satellite. It is determined whether at least one criterion is satisfied for using the selected SBAS satellite as a correction source and then processing the correction message received therefrom. A second SBAS satellite is selected from which to receive SBAS correction messages upon determining that at least one criterion is not satisfied for using the selected SBAS satellite as a correction source. One example of SBAS is the Wide Area Augmentation System (WAAS) used in North America Other aspects and embodiments are provided herein.

11 Claims, 15 Drawing Sheets

| 1674 | 1676 | 1678 | 1680 |
|---|---|---|---|
| CURRENT TIMER VARIABLE | SWAP TIMER VARIABLE | THRESHOLD CONSTANT TIMER DIFFERENCE | ANY PRESENTLY TRACKED SATELLITES HAVE VALID CORRECTIONS FROM CWCS VARIABLE |

| 1674 | 1676 | 1678 | 1682 | 1684 |
|---|---|---|---|---|
| CURRENT TIMER VARIABLE | SWAP TIMER VARIABLE | THRESHOLD CONSTANT TIMER DIFFERENCE | PRESENTLY COMPUTED POSITION FIX TYPE VARIABLE | CONSTANT ASSIGNED TO PRESENTLY COMPUTED POSITION FIX TYPE VARIABLE |

SPACE BASED AUGMENTATION SYSTEM WITH HIERARCHY FOR DETERMINING GEOGRAPHICAL CORRECTIONS SOURCE

CROSS REFERENCE TO RELATED APPLICATIONS

This application is related to the following co-pending, commonly assigned U.S. patent application: "Method and System for Minimizing Storage and Processing of Ionospheric Grid Point Correction Information," Ser. No. 09/969,698, now U.S. Pat. No. 6,552,680, which is by the same inventors and is herein incorporated by reference.

FIELD OF THE INVENTION

The present invention relates generally to Space Based Augmentation Systems (SBAS) and methods to improve the accuracy, availability, and integrity of Global Positioning System Service. In particular, the present invention is directed to SBAS with a hierarchy for determining a desired source for providing geographical correction messages.

BACKGROUND OF THE INVENTION

The Global Positioning System (GPS) is a worldwide radio-navigation system formed from a constellation of satellites and corresponding ground stations. Currently, approximately twenty-four satellites are used in the GPS. Each satellite continually broadcasts its location in space along with the current time from an internal clock. GPS receivers are able to determine their position by receiving and analyzing signals transmitted from the satellites. Two-dimensional locations are able to be determined by analyzing signals from three satellites, and three-dimensional locations are able to be determined by analyzing signals from four or more satellites. A GPS receiver determines its location by determining its distance from the GPS satellites based on the received signals and then performing a geometric triangulation on these distance measurements. GPS will be described in more detail below.

Although the current GPS has been successful, it has several shortcomings that affect the accuracy of positioning calculations. For example, GPS satellite signals are subject to errors caused by ionospheric disturbances and satellite orbit discrepancies. Ionospheric and tropospheric refraction can slow satellite signals and cause carrier signals and codes to diverge. Because ionospheric disturbances vary greatly from location to location, these errors are difficult to correct with civilian-type GPS receivers. These and other errors are described in more detail below.

Differential GPS (DGPS) can improve the accuracy of position measurements. DGPS uses an extra stationary receiver at a known location as a reference point. The stationary receiver measures GPS signal error by comparing its exact, known location with the location derived from the GPS signals. The reference receiver sends timing error measurements to mobile GPS receivers that allow these GPS receivers to correct for errors and get a more accurate position measurement. DGPS assumes that the reference point and other receivers will encounter similar errors. One example of DGPS is the Radio Technical Commission for Maritime (RTCM) Services, provided by the U.S. Coast Guard, which provide DGPS correction signals.

Space Based Augmentation Systems (SBAS) have been developed to further account for errors and better improve the accuracy, availability and integrity of the GPS. Wide Area Augmentation System (WAAS) is one type of Space Based Augmentation System (SBAS) used in North America. The Federal Aviation Administration (FAA) developed and uses WAAS to aid in landing aircraft. The FAA also has plans to develop a Local Area Augmentation System (LAAS) with reference receivers located near runways to further aid in landing aircraft, particularly in zero visibility conditions. One benefit of WAAS is that it provides extended coverage both inland and offshore compared to a land-based DGPS. Another benefit of WAAS is that it does not require additional DGPS receiving equipment.

Other governments are developing SBAS. In Asia, the SBAS is referred to as the Japanese Multi-Functional Satellite Augmentation System (MSAS). In Europe, the SBAS is referred to as the Euro Geostationary Navigation Overlay Service (EGNOS). Eventually, GPS users around the world likely will have access to precise position data using these and other SBAS systems.

As will be described in more detail below, the WAAS is based on a network of wide area ground reference stations (WRSs) that are linked to cover a service area including the entire U.S. and some areas of Canada and Mexico. The number of WRSs is currently about twenty-five. The WRSs are precisely surveyed so that the exact location of each WRS is known. Signals from GPS satellites are received and analyzed by the WRSs to determine errors in the signals, including errors caused by the ionospheric disturbances described above. Each WRS in the network relays its data to a wide area master station (WMS) where correction information is computed. The WMS calculates correction messages for each GPS satellite based on correction algorithms and assesses the overall integrity of the system. The correction messages are then uplinked to Geostationary Communication Satellites (GEOs), also referred to herein as SBAS satellites or more particularly as WAAS satellites, via a ground uplink system (GUS). The SBAS satellites broadcast the messages to GPS receivers within the coverage area of the SBAS satellites on the same frequency as the GPS signals (e.g. L1, 1575.42 MHz). GPS receivers with SBAS capabilities are capable of using the SBAS correction message to correct for GPS satellite signal errors caused by ionospheric disturbances and other inaccuracies. The SBAS satellites also act as additional navigation satellites for the GPS receivers, thus, providing additional navigation signals for position determination.

With respect to WAAS, the correction messages currently are uplinked to two WAAS satellites. In the future, additional WAAS satellites are intended to be incorporated in the system. The GPS receiver is capable of being positioned within the coverage area of both of these WAAS satellites such that the receiver is capable of receiving WAAS correction messages from any one or both of these WAAS satellites. Additional GEOs are capable of being used for a more comprehensive SBAS that provides a larger coverage and more redundancy. As such, a GPS receiver is capable of being positioned within the coverage area of two or more of these SBAS satellites such that the receiver is capable of receiving SBAS correction messages from any one of these SBAS satellites or from two or more of these SBAS satellites. Multiple WAAS satellites may be available in the future as potential sources of correction information.

The WAAS satellites broadcast several types of correction messages, and the information contained therein requires a substantial amount of memory in a GPS/WAAS receiver. In order to minimize the amount of memory required to store WAAS correction information, when multiple (i.e. two or more) WAAS satellites are available to be used by a GPS/WAAS receiver, it is desirable to obtain information only for the satellite that is the most reliable source of this information. The accuracy, desirability and/or equivalency of SBAS correction messages are not necessarily the same for the various SBAS correction sources. Accordingly, there exists a need for an improved method and system for determining the appropriate or desired geographical correction source for SBAS corrections and to benefit from the SBAS data while using a minimal amount of memory and system resources.

SUMMARY OF THE INVENTION

The above mentioned problems with the accuracy, availability and integrity of GPS service, along with the accuracy, desirability and/or equivalency of SBAS correction messages, are addressed by the present invention and will be understood by reading and studying the following specification. Systems, devices and methods are provided for determining the appropriate or desired geographical correction source for SBAS corrections. The systems and methods of the present invention offer various criteria, along with a hierarchy of these criteria, used in determining the appropriate or desired geographical correction source.

One aspect provided herein is a method. According to one embodiment, a Space Based Augmentation System (SBAS) correction message is received from a selected SBAS satellite. It is determined whether at least one criterion is satisfied for receiving the SBAS correction message from the selected SBAS satellite. Another SBAS satellite is selected from which to receive SBAS correction messages upon determining that at least one criterion is not satisfied for receiving the SBAS correction message from the selected SBAS satellite.

One embodiment provides a method in a global positioning system (GPS) for determining a wide area augmentation system (WAAS) corrections source. According to this embodiment, signals from at least two WAAS satellites are synchronized. One WAAS satellite from which to receive WAAS correction messages is selected. A WAAS correction message is received from a selected WAAS satellite. It is determined whether at least one criterion is satisfied for receiving the WAAS correction message from the selected WAAS satellite. Upon determining that at least one criterion is not satisfied for receiving the WAAS correction message from the selected WAAS satellite, another WAAS satellite is selected from which to receive WAAS correction messages.

According to one embodiment, it is determined whether at least one criterion is satisfied by: determining whether the selected SBAS satellite is sending SBAS correction messages; upon determining that the selected SBAS satellite is sending SBAS correction messages; determining whether the SBAS correction message received from the selected SBAS satellite is reliable (i.e. the selected satellite has a higher valid message rate than another satellite, for example); and upon determining that the SBAS correction message received from the selected SBAS satellite is reliable, determining whether a differential position can be created from the SBAS correction message.

One aspect provided herein is a data structure for use by a GPS receiver device in making SBAS corrections. One embodiment of the data structure includes a field representing an SBAS correction message, and a field representing at least one SBAS satellite selection criterion. According to one embodiment, the field representing an SBAS correction message includes a field representing an SBAS satellite identity, and a field representing SBAS correction data provided by the SBAS satellite identity. According to one embodiment, the field representing at least one SBAS satellite selection criterion includes a field representing an SBAS-correction-sent criterion, a field representing an SBAS-correction-reliable criterion, and a field representing a differential-position-calculation-capable criterion.

One aspect provided herein is a GPS receiver device. One embodiment of the device includes a processor, a memory adapted to communicate to the processor, and a GPS receiver. The GPS receiver is adapted to receive GPS signals and SBAS correction signals, and further is adapted to communicate to the processor. The device is adapted to determine a desired SBAS correction source using at least one predetermined criterion.

These and other aspects, embodiments, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 16A and 16B are representations of other data structures used by a GPS device in determining the satellite to be used for SBAS corrections.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to systems, devices and methods for determining the appropriate or desired geographical correction source for Space Based Augmentation System (SBAS) corrections. The systems and methods of the present invention offer a hierarchy used in determining the appropriate or desired geographical correction source in SBAS corrections.

Figure 1:
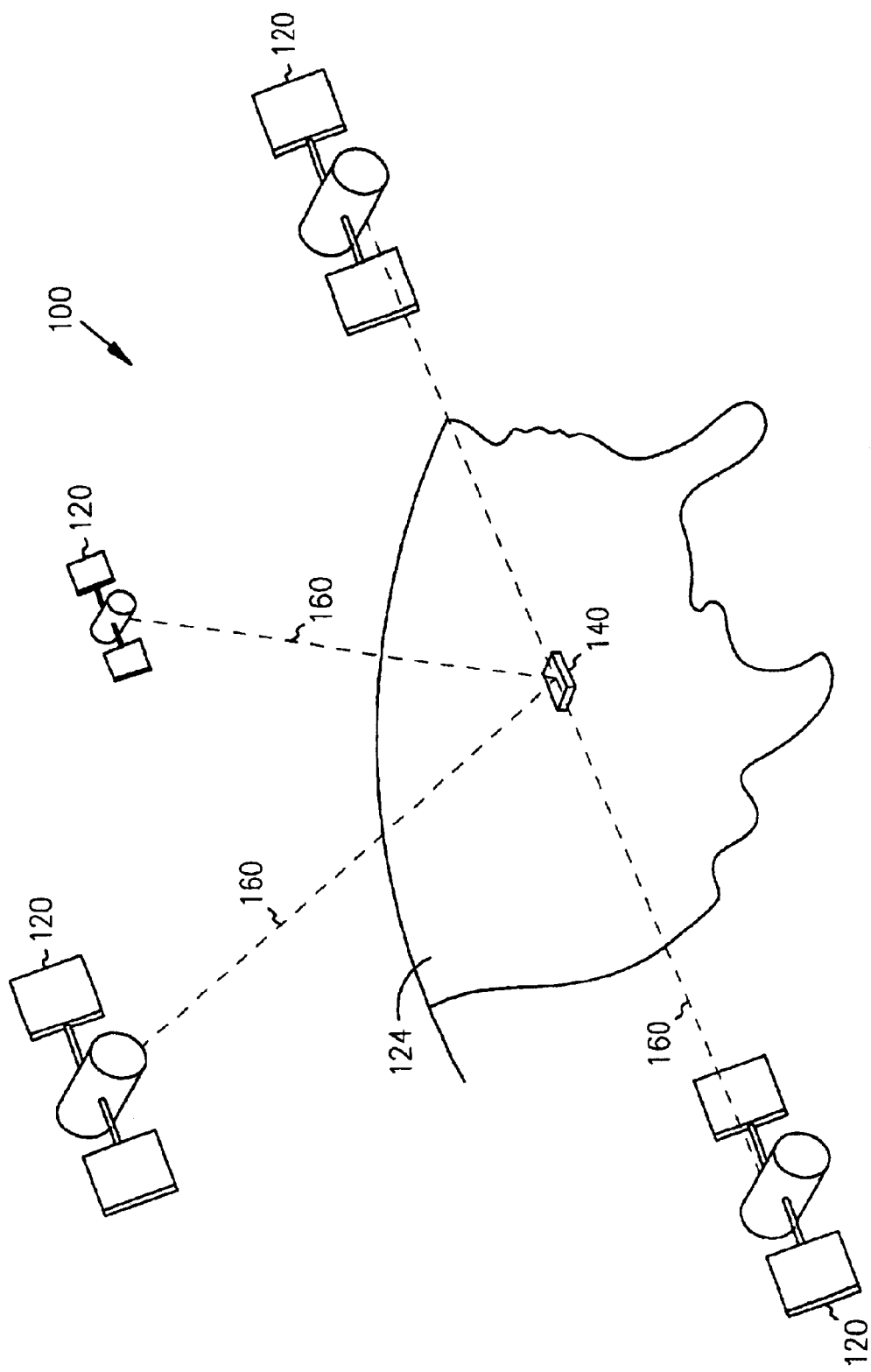
FIG. 1 is a representative view of a Global Positioning System (GPS)

FIG. 1 is a representative view of a global positioning system (GPS). The GPS 100 includes a plurality of satellites 120 and a GPS receiver device 140. The plurality of satellites 120 are in orbit about the Earth 124. The orbit of each satellite 120 is not necessarily synchronous with the orbits of other satellites 120 and, in fact, is likely asynchronous. The GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Currently, the constellation of GPS satellites 120 includes approximately twenty-four GPS satellites, twenty-one of which are active and three of which are operating spares. The satellites 120 are in a high orbit about 12,000 miles above the Earth's surface. The satellites 120 are arranged in their orbits such that the GPS receiver 140 on Earth is capable of receiving signals from at least four GPS satellites 120 at any given time if the signals are not otherwise blocked by buildings and the like. The satellites are traveling at speeds of about 7,000 miles an hour, so as to circle the earth once every twelve hours. They have small rocket boosters to keep them flying in the correct path.

Each GPS satellite 120 uses several frequencies (designated L1, L2, etc.) to continually broadcast the location of the satellite 120 in space along with the current time from an internal clock. Civilian GPS receivers 140 use the L1 frequency of 1575.42 MHz in the UHF band. The signals 160 travel in a "line of sight" (LOS); that is, the signal will pass through clouds, glass and plastic, but will not go through most solid objects such as buildings and mountains. The satellite signals 160 are very low power signals, on the order of 10 to 50 watts.

L1 contains two "pseudorandom" signals, each of which are a complex pattern of digital code. The transmitted code is referred to as a pseudorandom code because it looks like a noise signal. The code transmitted by each satellite is unique, such that the GPS receiver 140 is capable of identifying the GPS satellites 120 that transmit the pseudorandom signals. The message transmitted from the satellites 120 to a receiver 140 contains the satellite orbital and clock information, general system status messages and an ionospheric delay model. The satellite signals are timed using highly accurate atomic clocks. These coded signals are used to calculate the travel time from the satellite to the GPS receiver on the Earth. This travel time is also called the Time of Arrival. Multiplying the travel time by the speed of light (less any delay as the signal travels through the atmosphere) provides the satellite range; i.e. the distance from the satellite to the GPS receiver.

GPS receivers 140 are able to determine their position by receiving and analyzing signals 160 transmitted from the satellites 120. The GPS receiver 140 has to know the location of the satellites 120, and the distance between the satellites 120 and the receiver 140. To determine its location, a GPS receiver 140 scans for satellite signals 160 until it has acquired signals 160 from three or more satellites 120. Two-dimensional locations are able to be determined by analyzing signals 160 from three satellites 120, and three-dimensional locations are able to be determined by analyzing signals 160 from four or more satellites 120.

The GPS receiver 140 knows where the satellites 120 are located in space by identifying two types of coded information from the pseudorandom satellite signals 160. One type of information is called "almanac" data. Another type of information contained in the pseudorandom satellite signals is called "ephemeris" data.

Almanac data contains the approximate positions or locations of the satellites, and is continuously transmitted as coded information by the satellite and stored in the memory of the GPS receiver 140. Thus, the GPS receiver 140 knows the orbits of the satellites and the location where each satellite is supposed to be. The almanac data is periodically updated with new information.

Ephemeris data is corrected orbital data. The GPS satellites are capable of traveling slightly out of orbit. Ground monitor stations track the orbits, altitude, location and speed of the GPS satellites. The ground stations send the orbital data to the GPS master control station, which in turn sends corrected data up to the satellites. Ephemeris data is only sent every four to six hours.

The GPS receiver 140 determines its location by determining its distance from the GPS satellites 120 based on the received signals and then triangulating these distance measurements. The satellite 120 and the GPS receiver 140 generate the same code, and the receiver 140 compares the code that it generates against the code generated by the GPS satellite 120. The signal delay or shift needed for the code of the GPS receiver 140 to the code of the GPS satellite 120 represents the time required for the signal to propagate from the GPS satellite 120 to the GPS receiver 140. The distance, or range, from the GPS receiver 140 to the GPS satellite 120 is capable of being derived from this time. This distance calculation is repeated for at least three satellites in order to determine a two-dimensional position and for at least four satellites in order to determine a three-dimensional location.

It is noted that the clock in the GPS receiver 140 is not an atomic clock, and as such does not keep the time as precisely as the clocks of the satellites 120. Therefore, each distance measurement is corrected to account for the clock error in the GPS receiver 140. This distance or range correction attributable to the clock error is termed a pseudo range.

Although the current GPS has been successful, it has several shortcomings. For example, GPS satellite signals are subject to errors caused by ionospheric disturbances and satellite orbit discrepancies. Ionospheric and tropospheric refraction can slow satellite signals and cause carrier signals and codes to diverge. Because ionospheric disturbances vary greatly from location to location, these errors are difficult to correct with civilian-type GPS receivers. For example, the position errors of civilian GPS receivers are due to the accumulated errors of one or more of the following sources.

One error source is ionosphere and troposphere delays. The satellite signal slows as it passes through the atmosphere. GPS uses a built-in "model" that calculates an average, but not an exact amount of delay.

Another error source is signal multi-path, which occurs when the GPS signal reflects off of objects such as tall buildings and large rock surfaces before reaching the receiver. The reflection increases the travel time of the signal.

Another error source is receiver clock errors caused by slight timing errors in the built-in clock in the receiver. This error is corrected by determining pseudorange corrections.

Another error source is orbital errors, also known as ephemeris errors, which are inaccuracies of the satellite's reported location. As provided earlier, GPS determines ephemeris errors about every four to six hours. The GPS satellite sends ephemeris data along with the almanac data to the GPS receiver. However, this ephemeris data may be four to six hours old when received by the GPS receiver.

Another error involves the number of visible satellites. The accuracy of the receiver is better when the receiver is able to "see" more satellites, i.e. is able to receive more satellite signals. However, buildings, underground and underwater areas, terrain, electronic interference, and the like, are able to block signal reception.

Another error source involves satellite geometry, or shading, which refers to the relative position of the satellites at any given time. Ideal satellite geometry exists when the satellites are located at wide angles relative to each other. Poor geometry results when the satellites are located in a line or in a tight grouping.

Another error source, which occurred until the year 2000, is the United States military's intentional degradation of the GPS signal. This intentional degradation, also known as Selective Availability (SA), accounted for the majority of the error in the range.

Figure 2:
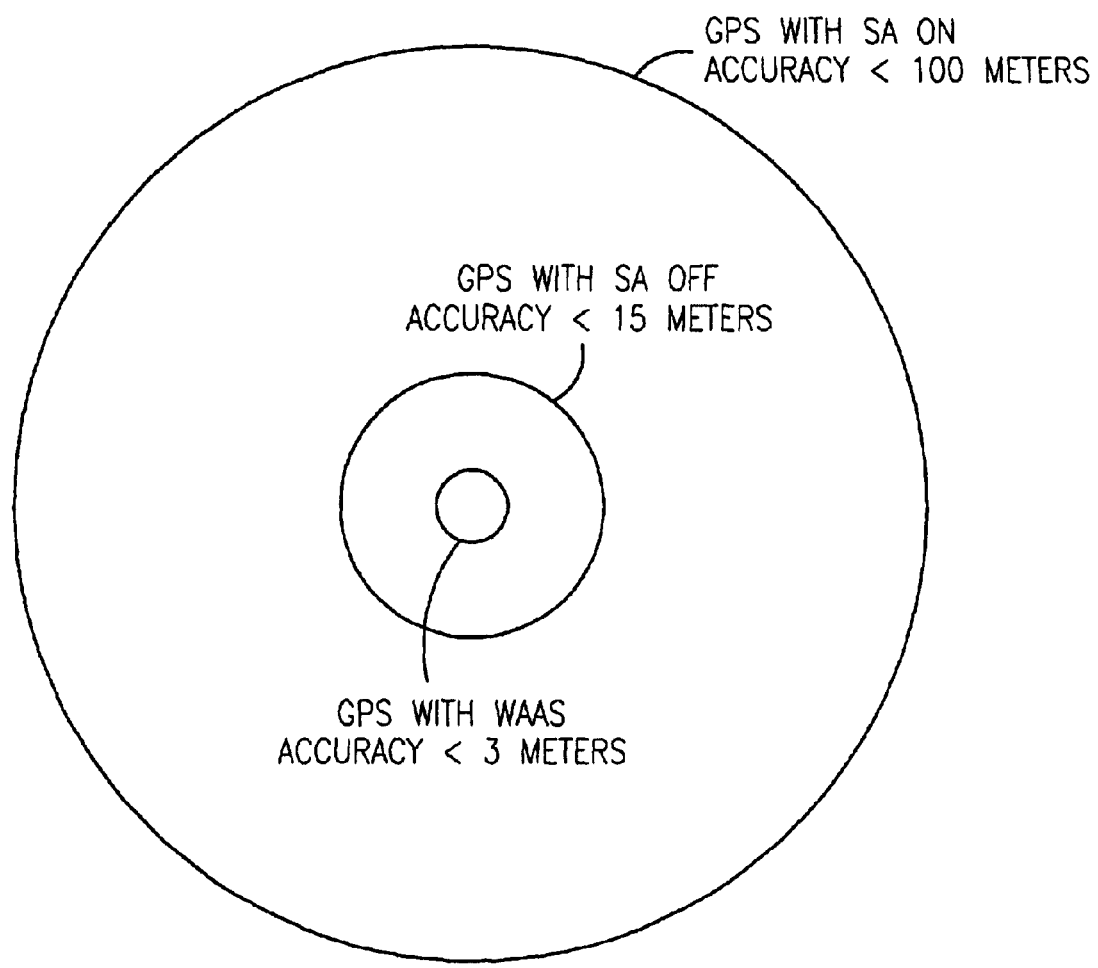
FIG. 2 is a chart plotting the progressiveness of GPS accuracy.

FIG. 2 is a chart plotting the progressiveness of GPS accuracy. According to this chart, GPS accuracy prior to the year 2000, when SA was operating, was within about 100 meters. GPS accuracy after SA was turned off improved dramatically to within about 15 meters. SBAS, such as WAAS, has been developed to accurately account for the above-described errors and improve the accuracy, availability and integrity of the GPS even further. As such, GPS with WAAS accuracy currently is within about 3 meters.

Figure 3:
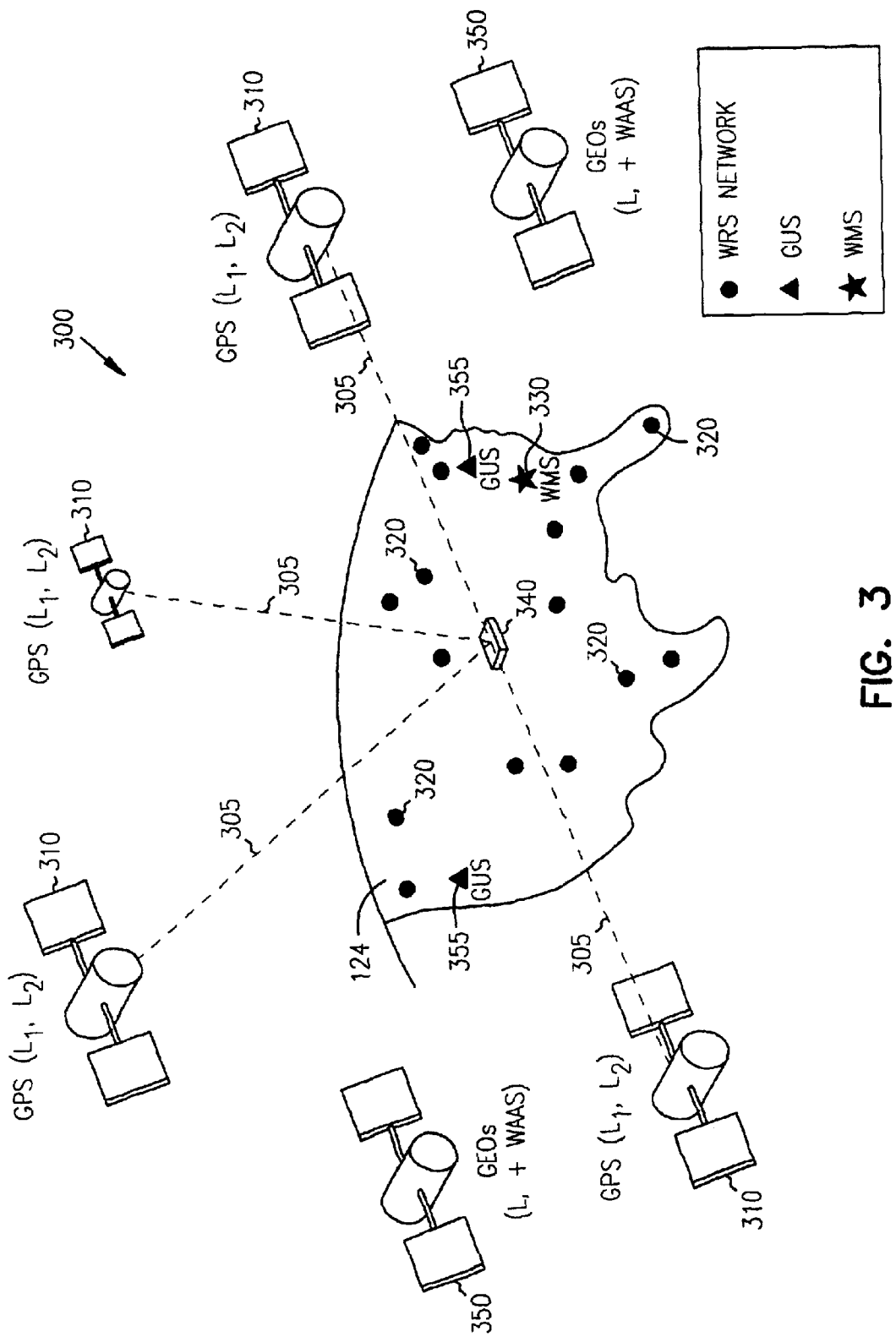
FIG. 3 is a representative view of a GPS with a Space Based Augmentation System (SBAS), particularly with a Wide Area Augmentation System (WAAS) used in North America.

FIG. 3 is a representative view of a GPS with a Space Based Augmentation System (SBAS), particularly with a Wide Area Augmentation System (WAAS) used in North America. The WAAS is based on a network of wide area ground reference stations (WRSs) 320 that are linked to cover a service area including the entire U.S. and some areas of Canada and Mexico. The number of WRSs 320 is currently about twenty-five. The WRSs are precisely surveyed so that the exact location of each WRS is known. Signals from GPS satellites 310 are received and analyzed by the WRSs to determine errors in the signals, including errors caused by the ionospheric disturbances described above. Each WRS 320 in the network relays its data to a wide area master station (WMS) 330 where correction information is computed. The WMS 330 calculates correction messages for each GPS satellite 310 based on correction algorithms and assesses the overall integrity of the system. The correction messages are then uplinked to a pair of Geostationary Communication Satellites (GEOs) 350 via a ground uplink system (GUS) 355. The GEOs 350 broadcast the messages on the same frequency as GPS (L1, 1575.42 MHz) to GPS receivers within the coverage area of the WAAS satellites. The GEOs 350 are also referred to herein as SBAS or WAAS satellites.

One type of information that is included in the correction messages from the WAAS satellites 350 is ionospheric correction data. Ionospheric corrections are broadcast for selected ionospheric grid points generally spaced at 5 degree intervals in both latitude and longitude directions. GPS receivers 340 use the WAAS correction data to correct for GPS satellite signal errors caused by ionospheric disturbances and other inaccuracies. The communications satellites 350 also act as additional navigation satellites for the GPS receivers 340, thus, providing additional navigation signals for position determination.

Figure 4:
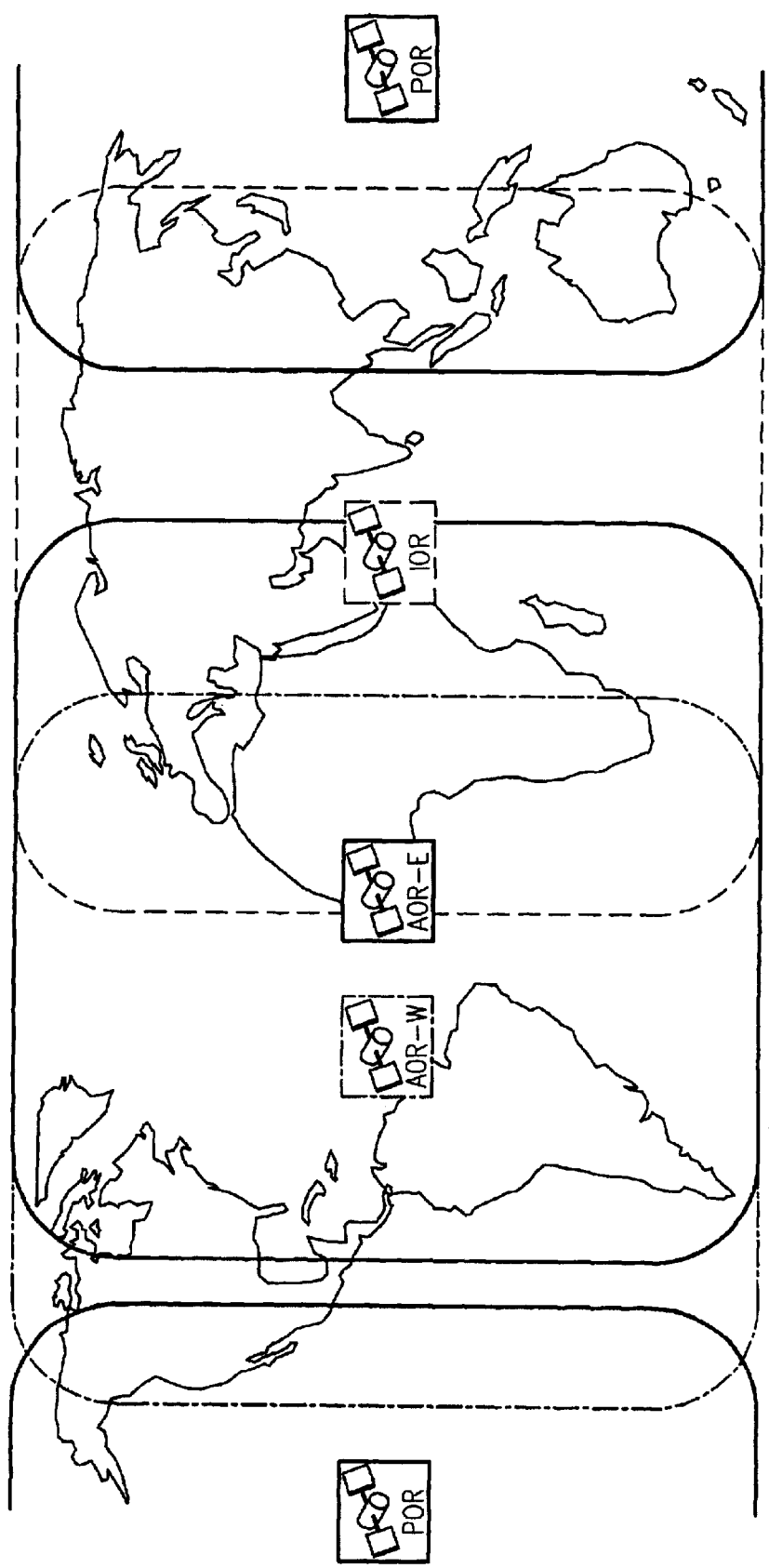
FIG. 4 is a representative view of Geostationary Communication Satellites (GEOs) and their overlapping coverage area.

FIG. 4 is a representative view of Geostationary Communication Satellites (GEOs) and their overlapping coverage area. GEOs are capable of being used as SBAS satellites, such as WAAS satellites, EGNOS satellites and MSAS satellites for example. The coverage area for these SBAS satellites overlap. In a WAAS system, for example, portions of the United States are covered by both the POR satellite and the AOR-W satellite. The illustrated AOR-E satellite and IOR satellite, which may be used in EGNOS, MSAS or other SBAS, also share coverage areas with other SBAS satellites. If and/or when they become available, other SBAS satellites may be used to provide redundancy in the signal coverage.

Due to the overlapping coverage area, the GPS receiver device often will be able to receive SBAS correction signals from more than one SBAS satellite. The corrections contained within these signals can and often will vary. A choice is made as to which SBAS satellite should be used as the geographical correction source.

Another problem, aside from simply listening to the correct satellite, is the shear volume of transmission correction data. As mentioned above, one type of information that is included in the correction messages from the GEOs is ionospheric correction data. Ionospheric corrections are broadcast for selected ionospheric grid points generally spaced at 5 degree intervals in both latitude and longitude directions. One approach is to store the correction points in a two dimensional array containing a total of 2,592 elements. Many GPS receivers, including, for example, GPS receivers used in avionics applications and portable GPS receivers used for recreational and sport applications have limited memory and processing power and therefore cannot quickly and efficiently store and process all 2,592 ionospheric grid point correction elements. This problem is addressed by the Applicants' co-pending and commonly assigned U.S. patent application: "Method and System for Minimizing Storage and Processing of Ionospheric Grid Point Correction Information," Ser. No. 09/969,698, now U.S. Pat. No. 6,552,680. This problem is compounded if a given receiver is taking corrections from more than one satellite in an area where the GEOs coverage overlaps. As such, for the purpose of limiting the shear volume of correction data as well as for the purpose of selecting the most accurate correction data, it is desirable to make an informed decision for selecting a satellite from which SBAS signals are to be received. There are several reasons for requiring the ability to select another SBAS satellite, or swap SBAS satellites in the current two SBAS satellite system. One reason is that the currently-selected SBAS satellite is not broadcasting corrections. Another reason is that the currently-selected SBAS satellite has a lower valid message rate than another SBAS satellite due to factors such as being blocked by terrain, buildings or vegetation or being lower on the horizon.

The present invention provides an improved SBAS and method which allows a given GPS receiver to correctly identify and selectively receive those transmission correction signals to provide consistent and accurate SBAS corrections. Moreover, the improved SBAS and method of the present invention benefits from the SBAS data while utilizing a minimal amount of memory and system resources.

The present invention may be implemented with and/or incorporated into any global positioning system (GPS) device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, etc.

Figure 5:
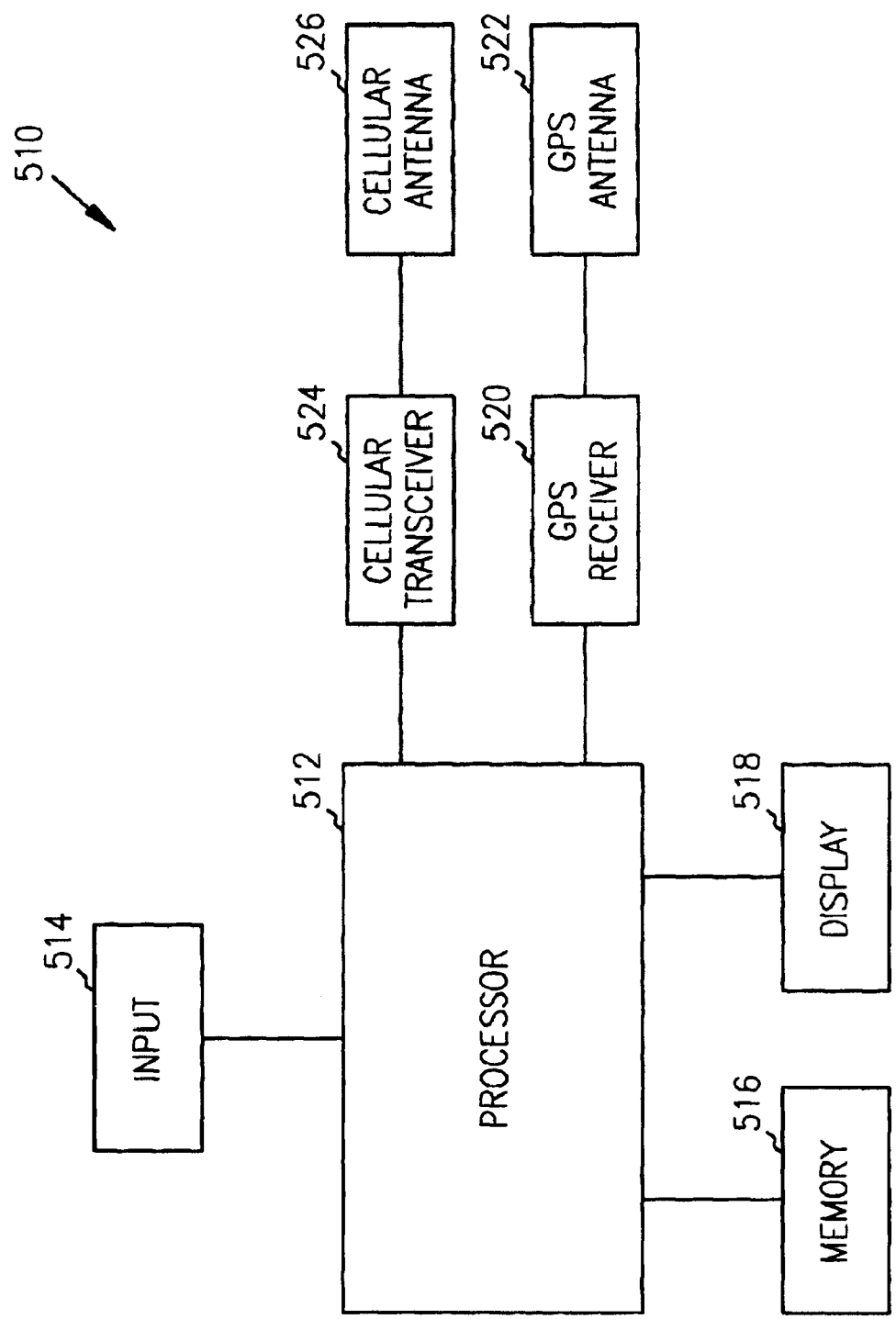
FIG. 5 is a representative view of a suitable GPS device for implementing the present invention.

FIG. 5 is a representative view of a suitable GPS device for implementing the present invention. The GPS device 510 illustrated and described herein is only one example of a suitable device or environment and is not intended to suggest any limitation as to the scope of use or functionality of the present invention. Neither should the GPS device 510 be interpreted as having any dependency or requirement relating to any one or a combination of components illustrated in this exemplary GPS device 510.

As shown in FIG. 5, one embodiment of the GPS device 510 includes a processor 512 coupled with an input device 514, memory 516, and a display 518. The processor is further coupled with a GPS receiver 520 that is in turn coupled with a GPS antenna 522. In one embodiment, the processor 512 may also be coupled with a cellular phone transceiver 524 and corresponding antenna 526. It will be understood that the input may be any type of input, such as a keypad, switches, touch screen, voice-input (such as a microphone), mouse or joystick, etc. As one of ordinary skill in the art will understand upon reading this disclosure, the electronic components shown in FIG. 5 can be embodied as computer hardware circuitry or as a computer-readable program, or a combination of both.

The present invention may also be described in the context of computer-executable instructions, such as program modules, being executed by a computer. Generally, program modules include routines, programs, objects, components, data structures, etc. that perform particular tasks or implement particular abstract data types.

Processor 512 typically accesses at least some form of computer-readable media. Computer-readable media include any available media that is accessible by the GPS system. By way of example and not limitation, computer-readable media include computer storage media and communications media. Computer storage media includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave or transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of any of the above would also be included within the scope of computer-readable media.

Figure 6:
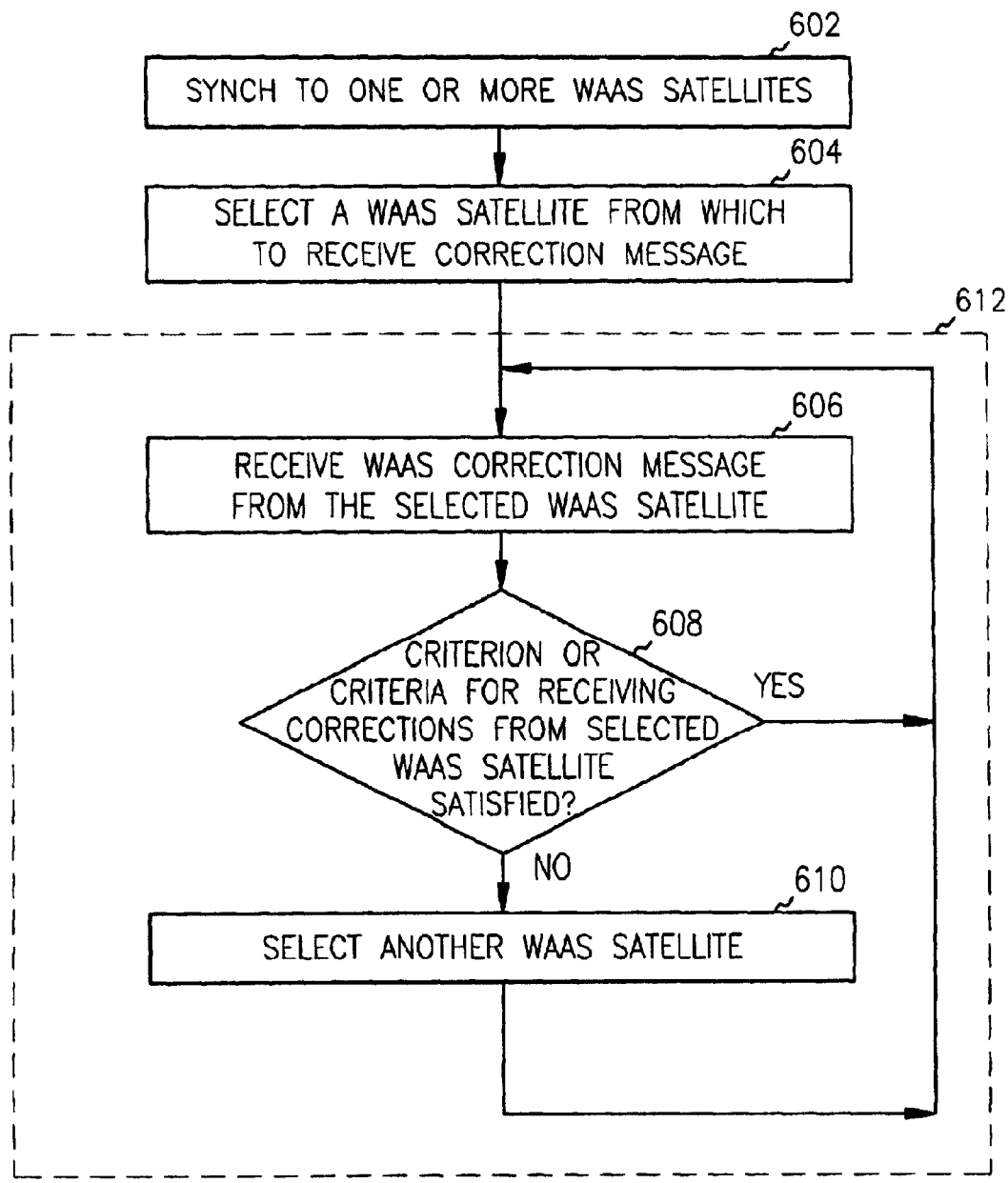
FIG. 6 is a flow diagram illustrating one method embodiment according to the present invention.

FIG. 6 is a flow diagram illustrating one method embodiment according to the present invention. A GPS receiver device such as shown in FIG. 5, for example, synchronizes to signals from at least two WAAS satellites at 602. One of ordinary skill in the art will understand, upon reading and comprehending this disclosure, that other SBAS satellites such as EGNOS and MSAS satellites may be used in place of the WAAS satellites. Proceeding to 604, a WAAS satellite is selected as the satellite from which to receive correction messages. For example, according to one embodiment, the first WAAS satellite that is synchronized is selected as the initial satellite from which to receive correction messages. According to another embodiment, ionospheric bounding box criteria is used as the criteria for selecting the initial satellite from which to receive correction messages. Ionospheric boundaries are discussed in Applicants' co-pending, commonly assigned, U.S. patent application entitled "Method and System for Minimizing Storage and Processing of Ionospheric Grid Point Correction Information," Ser. No. 09/969,698, now U.S. Pat. No. 6,552,680. This application has previously been incorporated by reference herein.

Proceeding to 606, a WAAS correction message, or messages, is received from the selected WAAS satellite. Data included in WAAS correction messages includes mask data and correction data. At 608, it is determined whether a criterion, or criteria, for receiving corrections from the selected WAAS satellite is satisfied. Upon determining that the criterion/criteria is satisfied, the process proceeds back to 606 to continue to receive WAAS correction messages from the selected WAAS satellite. Upon determining that the criterion is not satisfied, the process proceeds to 610 where another WAAS satellite is selected prior to proceeding back to 606 to receive WAAS correction messages from the newly selected WAAS satellite. The WAAS correction messages are processed to provide a WAAS-corrected GPS position when the criterion is satisfied. A dotted line box 612 is drawn around the elements 606, 608, and 610, and provides a point of reference for the details pill illustrated below in FIGS. 7–11.

Figure 7:
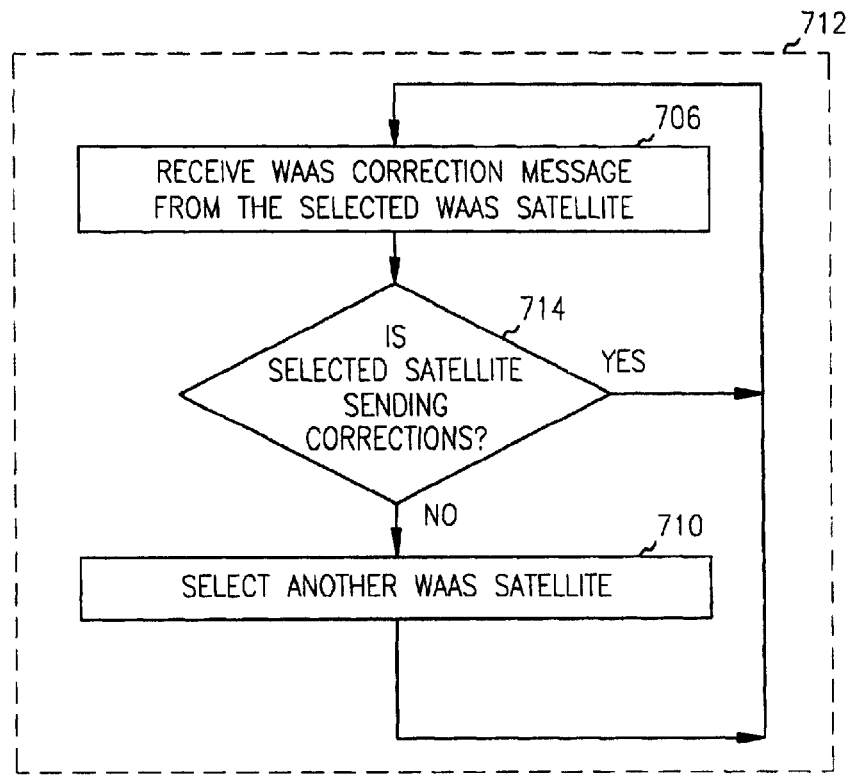
FIG. 7 is a flow diagram illustrating in further detail portions of the flow diagram of FIG. 6 for one embodiment one the present invention.

FIG. 7 is a flow diagram illustrating in further detail portions of the flow diagram of FIG. 6 for one embodiment of the present invention. The dotted line box 712 corresponds generally to the dotted line box 612 illustrated in FIG. 6. According to this embodiment, at 706, a WAAS correction message, or messages, is received from the selected WAAS satellite. At 714, it is determined whether the selected satellite is sending corrections. Currently, the correction messages provided by the WAAS satellites indicate whether or not they are sending corrections using a bit set in the almanac message (Message Type 17). That is, the WAAS almanac messages (Message Type 17) contain information about the health of the WAAS satellites. This health information includes separate bits. A first bit indicates whether the satellite's ranging is on or off. A second bit indicates whether the satellite's corrections are on or off. A third bit indicates whether the satellite's broadcast integrity is on or off. One embodiment of the present invention evaluates the bit that indicates whether the satellite's corrections are on or off. Upon determining that the selected satellite is sending corrections, the process proceeds back to 706 to continue to receive WAAS correction messages from the selected WAAS satellite. Upon determining that the selected satellite is not sending corrections, the process proceeds to 710 where another WAAS satellite is selected. The process then proceeds back to 706 to receive WAAS correction messages from the newly selected WAAS satellite.

Figure 8:
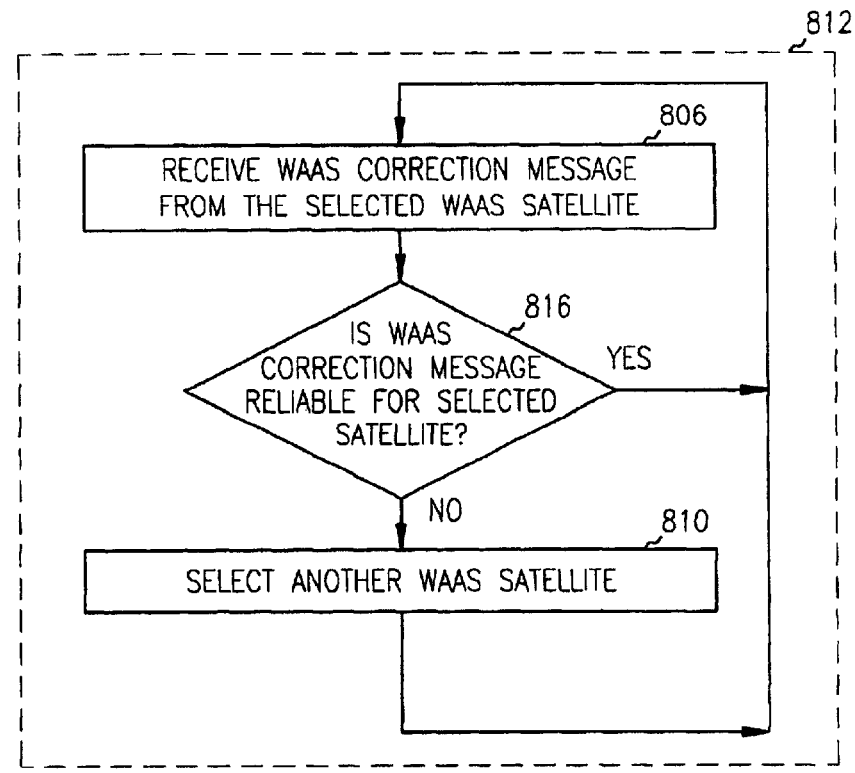
FIG. 8 is a flow diagram illustrating in further detail portions of the flow diagram of FIG. 6 for one embodiment of the present invention.

FIG. 8 is a flow diagram illustrating in further detail portions of the flow diagram of FIG. 6 for one embodiment of the present invention. The dotted line box 812 corresponds generally to the dotted line box 612 illustrated in FIG. 6. According to this embodiment, at 806, a WAAS correction message, or messages, is received from the selected WAAS satellite. At 816, it is determined whether the received WAAS correction message is reliable for the selected WAAS satellite. In one embodiment, the reliability of the WAAS correction message is determined using a Cyclic Redundancy Check (CRC). CRC is a process used to check the integrity of a block of data. A 24-bit CRC is generated at the SBAS satellite. The value of the 24-bit CRC depends on the number of ones in the data block. The 24-bit CRC is appended on to the data block. The GPS receiver device makes a similar calculation and compares its results with the transmitted 24-bit CRC. If there is a difference, it is determined that the WAAS correction message is not reliable. If there in not a difference, it is determined that the WAAS correction message is reliable. In one embodiment, which will be described in more detail below, valid message counters are used to evaluate whether the selected satellite or another satellite is sending more reliable correction messages. Upon determining that the received WAAS correction message is reliable for the selected WAAS satellite, the process proceeds back to 806 to continue to receive WAAS correction messages from the selected WAAS satellite. Upon determining that the received WAAS correction message is not reliable for the selected WAAS satellite, the process proceeds to 810 where another WAAS satellite is selected prior to proceeding back to 806 to receive WAAS correction messages from the newly selected WAAS satellite.

Figure 9:
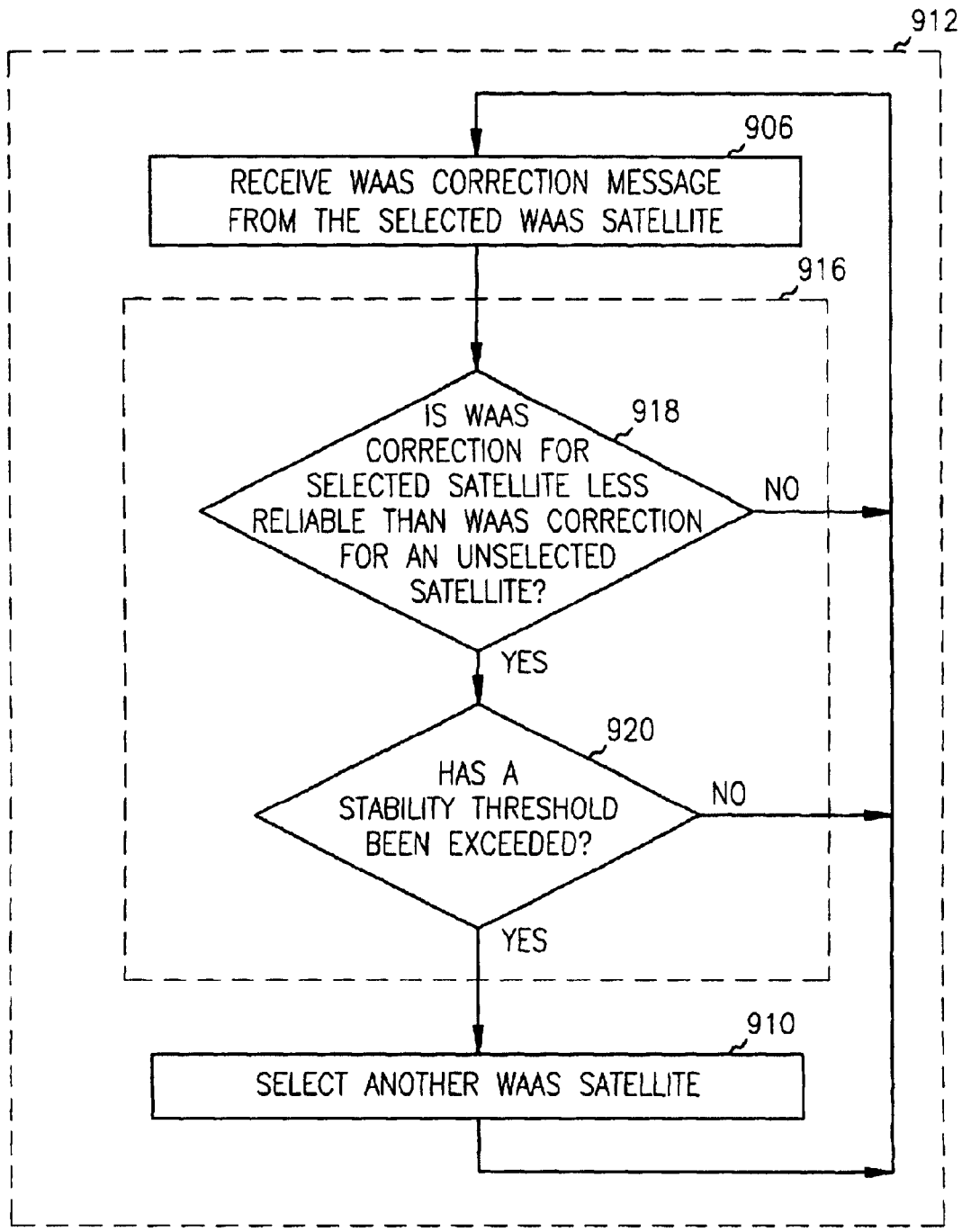
FIG. 9 is a flow diagram illustrating in further detail portions of the flow diagram of FIG. 6 for one embodiment of the present invention.

FIG. 9 is a flow diagram illustrating in further detail portions of the flow diagram of FIG. 6 for one embodiment of the present invention. The dotted line box 912 corresponds generally to the dotted line box 612 illustrated in FIG. 6. Furthermore, the dotted line box 916 corresponds generally to element 816 (i.e. determining whether the received WAAS correction message is reliable for the selected WAAS satellite) in FIG. 8. It is noted that reliability information regarding a correction message from a previously selected WAAS satellite is capable of being saved for later comparison to a currently selected WAAS satellite. Also, it is noted that correction messages from two or more WAAS satellites are capable of being received concurrently, or relatively concurrently, such that the reliability of the signals are capable of being compared. According to various embodiments, this reliability information is capable of being weighted or otherwise characterized as appropriate in order to perform a desired comparison for a desired application.

According to this embodiment, at 906, a WAAS correction message, or messages, is received from the selected WAAS satellite. Once the received WAAS signals have been assessed, a WAAS satellite is selected as the preferred satellite from which to use and process correction messages. At 918, it is determined whether the WAAS correction message for the presently selected satellite is less reliable than a WAAS correction message for a previously selected satellite or a presently unselected satellite. Upon determining that the WAAS correction message for the selected satellite is not less reliable than a WAAS correction message for a previously selected or a presently unselected satellite, the process proceeds back to 906 to continue to receive WAAS correction messages from the selected WAAS satellite. Upon determining that the WAAS correction message for the selected satellite is less reliable than a WAAS correction message for an unselected satellite, the process proceeds to 920 where it is determined whether a stability threshold has been exceeded. Such a stability threshold provides a hysteresis effect that prevents the receiver device from quickly toggling between two WAAS satellites for relatively inconsequential differences in the reliability of the WAAS correction signal. Upon determining that a stability threshold has not been exceeded, the process proceeds back to 906 to continue to receive WAAS correction messages from the selected WAAS satellite. Upon determining that a stability threshold has been exceeded, the process proceeds to 910 where another WAAS satellite is selected prior to proceeding back to 906 to receive WAAS correction messages from the newly selected WAAS satellite.

For example, as will be described in more detail below, one embodiment provides a valid message counter for a Current WAAS Correction Satellite (CWCS) and a valid message counter for a Potential WAAS Correction Satellite (PWCS). If the PWCS valid message counter is greater than the CWCS valid message counter by a threshold (such as 10%), the PWCS becomes the CWCS.

Figure 10:
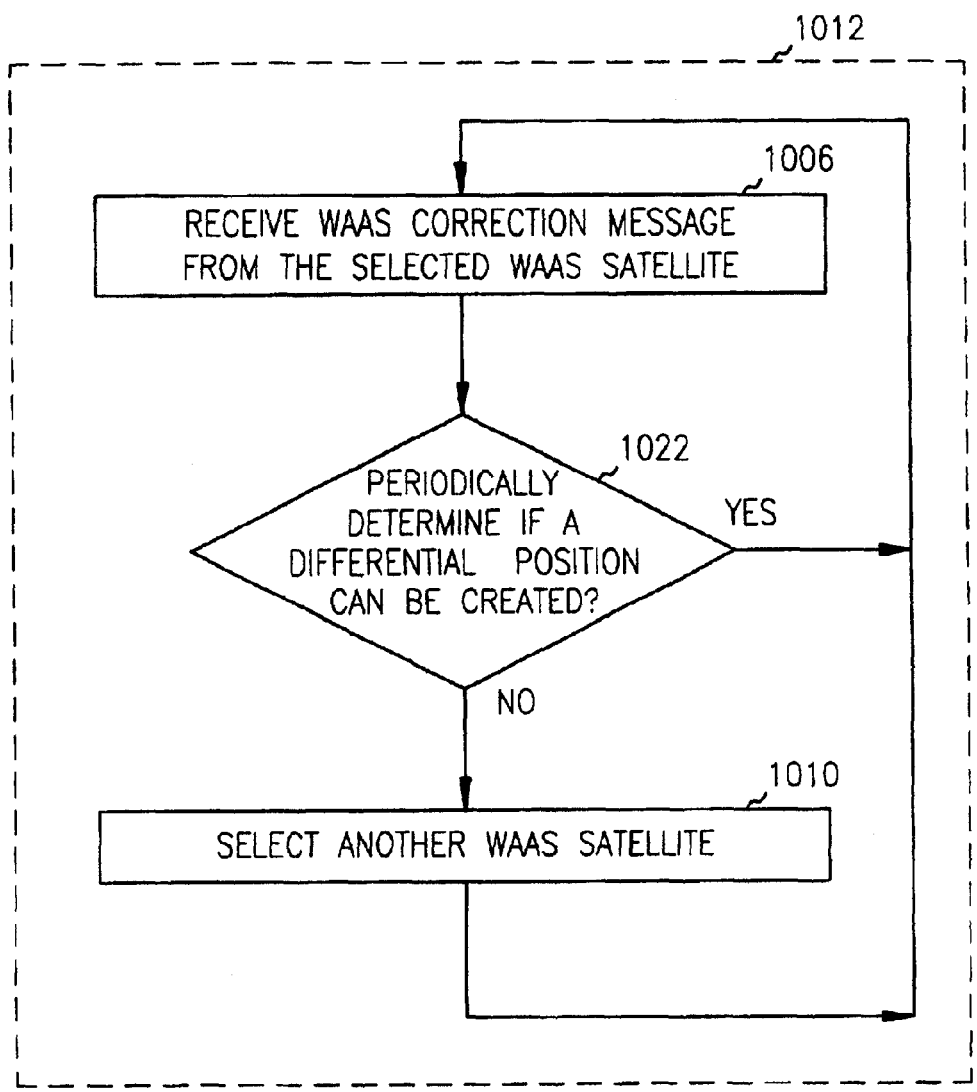
FIG. 10 is a flow diagram illustrating in further detail portions of the flow diagram of FIG. 6 for one embodiment of the present invention.

FIG. 10 is a flow diagram illustrating in further detail portions of the flow diagram of FIG. 6 for one embodiment of the present invention. The dotted line box 1012 corresponds generally to the dotted line box 612 illustrated in FIG. 6. According to this embodiment, at 1006, a WAAS correction message, or messages, is received from the selected WAAS satellite. At 1022, it is determined whether a differential position can be created from the WAAS correction message provided by the selected WAAS satellite. According to one embodiment, the determination at 1022 is periodically performed. Upon determining that a differential position can be created from the WAAS correction message provided by the selected WAAS satellite, the process proceeds back to 1006 to continue to receive WAAS correction messages from the selected WAAS satellite. Upon determining that a differential position cannot be created from the WAAS correction message provided by the selected WAAS satellite, the process proceeds to 1010 where another WAAS satellite is selected prior to proceeding back to 1006 to receive WAAS correction messages from the newly selected WAAS satellite.

For example, as will be described in more detail below, timer variables are used to periodically determine whether a differential position can be created from the WAAS correction messages provided by the selected WAAS satellite.

SBAS corrections includes several corrections that occur often (or with a quick update rate), and several corrections that occur with a lower update rate such as approximately every five minutes. In one embodiment, the determination whether a differential position can be created is made approximately every ten minutes, which is approximately twice as long as the period for the SBAS correction(s) with the slowest update rate.

Figure 11:
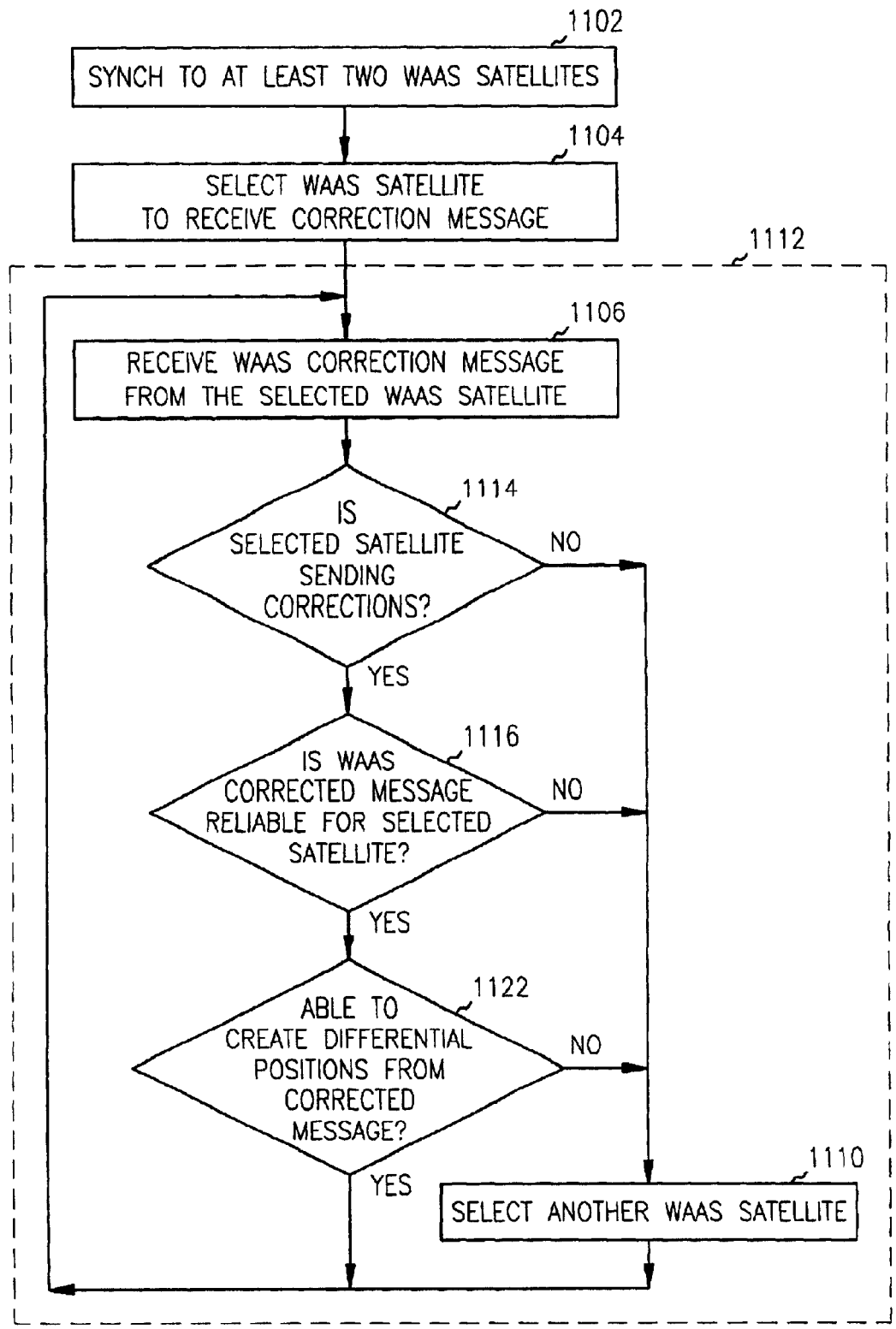
FIG. 11 is a flow diagram illustrating in further detail portions of the flow diagram of FIG. 6 for one embodiment of the present invention.

FIG. 11 is a flow diagram illustrating in further detail portions of the flow diagram of FIG. 6 for one embodiment of the present invention. The dotted line box 1112 corresponds generally to the dotted line box 612 illustrated in FIG. 6. A GPS receiver device such as shown in FIG. 5, for example, synchronizes to signals from at least two WAAS satellites at 1102. One of ordinary skill in the art will understand, upon reading and comprehending this disclosure, that other SBAS satellites such as EGNOS and MSAS satellites may be used in place of the WAAS satellites. Proceeding to 1104, a WAAS satellite is selected as the satellite from which to receive correction messages. For example, according to one embodiment, the first WAAS satellite that is synchronized is selected as the initial satellite from which to receive correction messages. According to another embodiment, ionospheric bounding box criteria is used as the criteria for selecting the initial satellite from which to receive correction messages. One embodiment of a hierarchy for determining a geographical corrections source is illustrated within box 1112. According to this embodiment, at 1106, a WAAS correction message, or messages, is received from the selected WAAS satellite.

At 1114, it is determined whether the selected satellite is sending corrections. Currently, the correction messages provided by the WAAS satellites indicate whether or not they are sending corrections. One of ordinary skill in the art will understand that there are other ways for determining whether the selected satellite is sending corrections. Upon determining that the selected satellite is sending corrections, the process proceeds to 1116 to determine whether another criterion is satisfied for receiving the SBAS correction message from the selected SBAS satellite. Upon determining that the selected satellite is not sending corrections, the process proceeds to 1110 where another WAAS satellite is selected prior to proceeding back to 1106 to receive WAAS correction messages from the newly selected WAAS satellite.

At 1116, it is determined whether the received WAAS correction message is reliable for the selected WAAS satellite. Upon determining that the received WAAS correction message is reliable for the selected WAAS satellite, the process proceeds to 1122 to determine whether another criterion is satisfied for receiving the SBAS correction message from the selected SBAS satellite. Upon determining that the received WAAS correction message is not reliable for the selected WAAS satellite, the process proceeds to 1110 where another WAAS satellite is selected prior to proceeding back to 1106 to receive WAAS correction messages from the newly selected WAAS satellite.

At 1122, it is determined whether a differential position can be created from the WAAS correction message provided by the selected WAAS satellite. According to one embodiment, the determination at 1122 is periodically performed. That is, the determination at 1122 is not always performed in this embodiment, but rather is performed as desired as may be appropriate for the system resources. Upon determining that a differential position can be created from the WAAS correction message provided by the selected WAAS satellite, the process completes the hierarchy for determining geographical corrections source and proceeds back to 1106 to continue to receive WAAS correction messages from the selected WAAS satellite. Upon determining that a differential position cannot be created from the WAAS correction message provided by the selected WAAS satellite, the process proceeds to 1110 where another WAAS satellite is selected prior to proceeding back to 1106 to receive WAAS correction messages from the newly selected WAAS satellite. One of ordinary skill in the art will understand, upon reading and comprehending this disclosure, that various embodiments include various combinations of the determinations 1114, 1116 and 1122.

Figure 12:
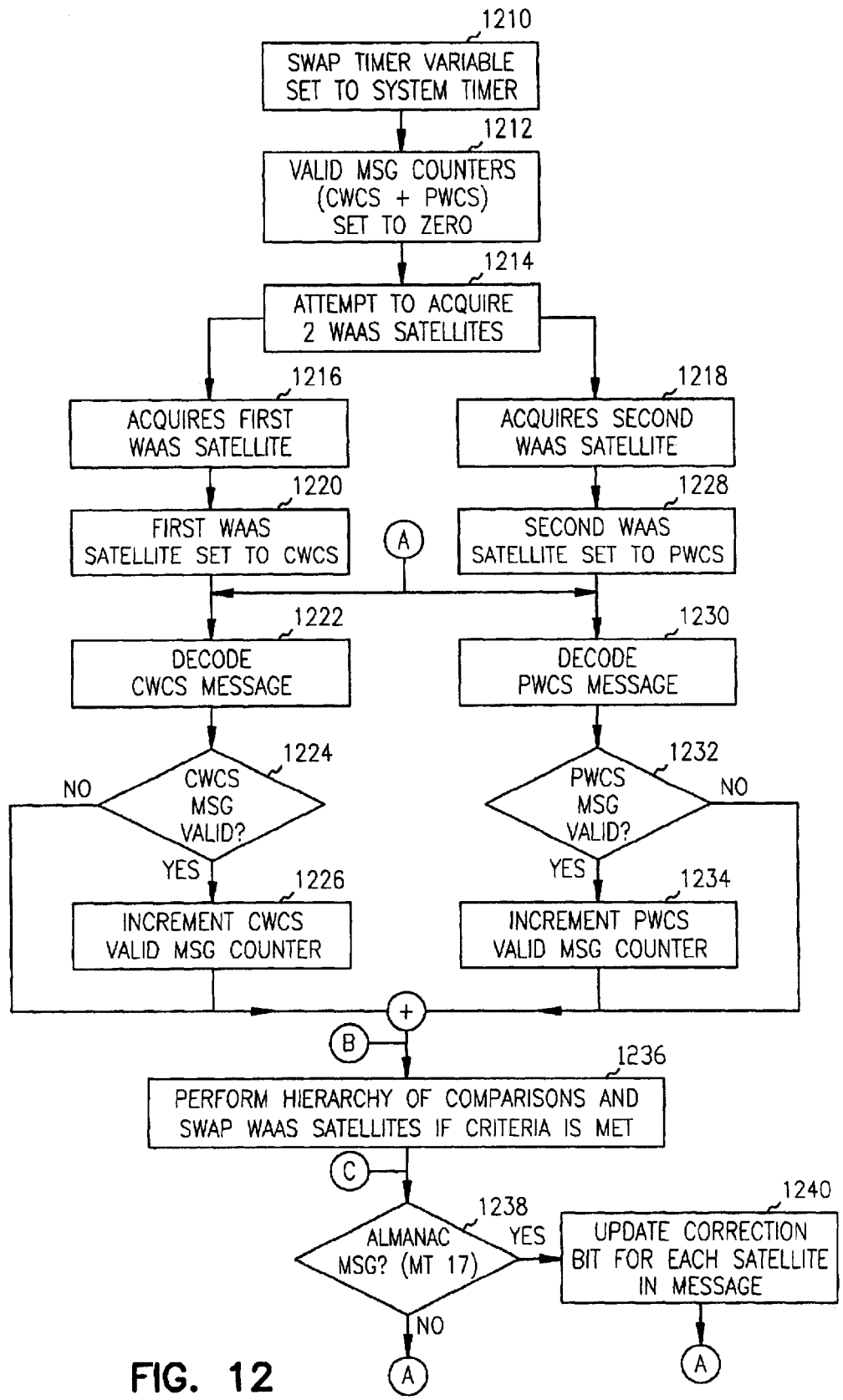
FIG. 12 is a flow diagram illustrating one method embodiment according to the present invention.

FIG. 12 is a flow diagram illustrating one method embodiment according to the present invention. It is noted that the term WAAS may be replaced with a more general term SBAS throughout this description. According to this method, a swap timer variable is set to a system timer of the GPS/WAAS receiver unit at 1210. Valid message counters are set to zero at 1212. In one embodiment for a two WAAS satellite system, the valid message counters include a Current WAAS Correction Satellite (CWCS) counter and a Potential WAAS Correction Satellite (PWCS) counter. At 1214, the GPS/WAAS receiver unit attempts to acquire signals from two WAAS satellites. The process proceeds to 1216 upon acquiring a first WAAS satellite signal and proceeds to 1218 upon acquiring a second WAAS satellite signal. The process beginning with that represented by 1216 and the process beginning with that represented by 1218 are capable of being performed relatively independent of each other.

At 1216, a first WAAS satellite signal is acquired. The first WAAS satellite is set to the CWCS as the currently selected satellite at 1220. The CWCS message is decoded at 1222. At 1224, it is determined wither the CWCS message is valid. Upon determining the CWCS message is valid, the process proceeds to 1226 where the CWCS valid message counter is incremented.

At 1218, a second WAAS satellite signal is acquired. The second WAAS satellite is set to PWCS as a potentially selected satellite at 1228. The PWCS message is decoded at 1230. At 1232, it is determined whether the PWCS message is valid. Upon determining the PWCS message is valid, the process proceeds to 1234 where the PWCS valid message counter is incremented.

At 1236, a hierarchy of comparisons of the CWCS and the PWCS is performed, and the WAAS satellites are swapped (such that the first satellite is now PWCS and the second satellite is now CWCS) if various criteria are met. This process is illustrated further with respect to FIG. 13. The process proceeds to 1238, where it is determined whether an almanac message (Message Type 17 in particular) is received such that the health of the satellites can be determined. Upon determining that an almanac message has been received, the process proceeds to 1240 where the correction bit is updated for each satellite whose health is reported in the almanac message. The process returns to decode messages, as represented by the node A.

Figure 13:
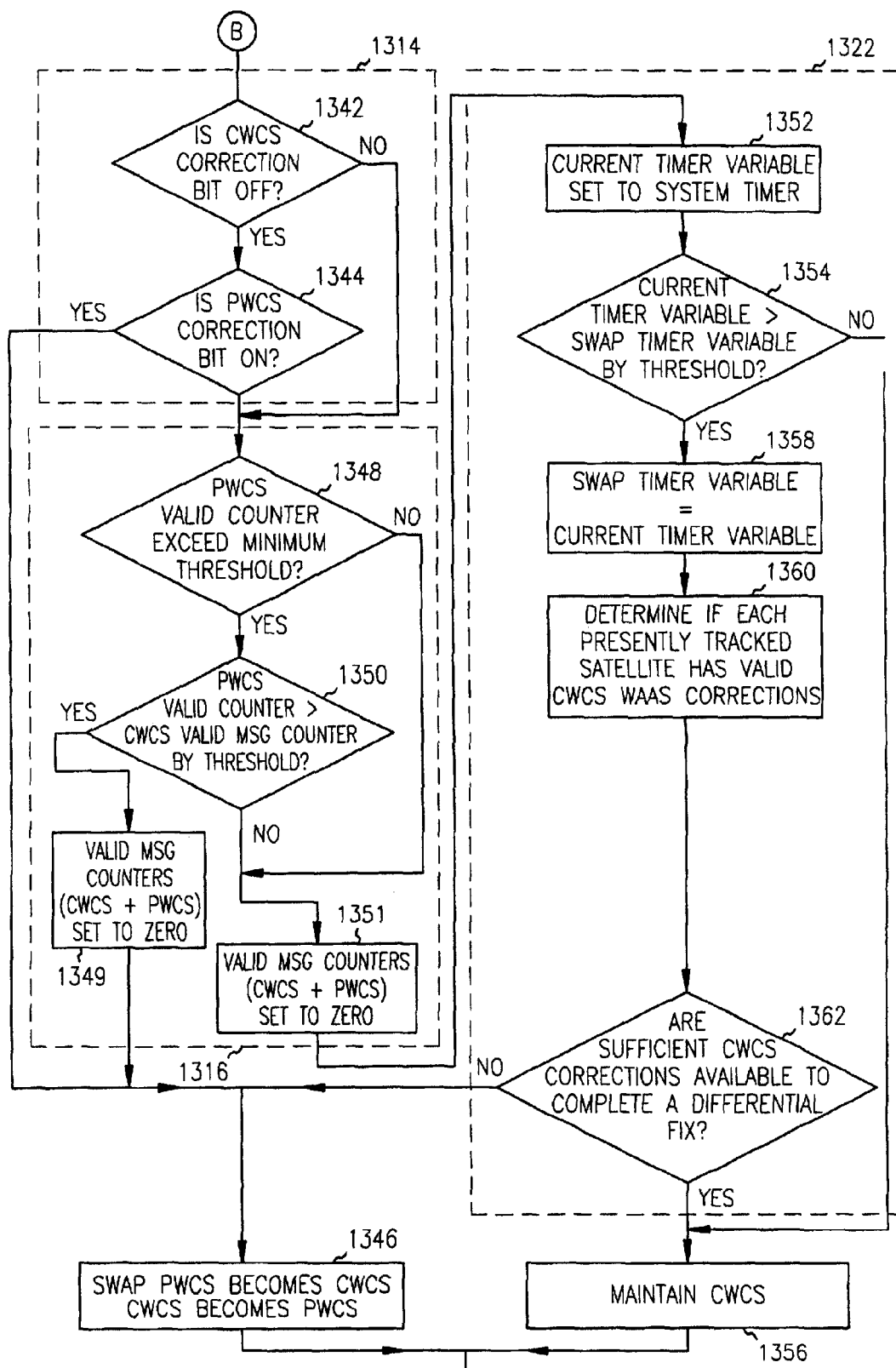
FIG. 13 is a flow diagram illustrating in further detail portions of the flow diagram of FIG. 12 for one embodiment of the present invention.

FIG. 13 is a flow diagram illustrating in further detail portions of the flow diagram of FIG. 12 for one embodiment of the present invention. The illustrated flow diagram generally corresponds to performing the hierarchy of comparisons 1236 in FIG. 12. The illustrated process for this embodiment of performing the hierarchy of comparisons proceeds through three general criteria, as identified by the dotted line boxes 1314, 1316 and 1322, which generally correspond to the three criteria 1114, 1116 and 1122 illustrated in FIG. 11.

The WAAS almanac messages (Message Type 17) contain information about the health of the WAAS satellites. This health information includes separate bits. A first bit indicates whether the satellite's ranging is on or off. A second bit indicates whether the satellite's corrections are on or off. A third bit indicates whether the satellite's broadcast integrity is on or off. One embodiment of the present invention evaluates the bit that indicates whether the satellite's corrections are on or off. At 1342, it is determined whether the CWCS correction bit is off, and at 1344, it is determined whether the PWCS correction bit is on. If the correction health bit for the CWCS is off and the correction health bit for the PWCS is on, the PWCS becomes the CWCS, as represented at 1346. If not, the process proceeds to criteria 1316.

At 1348, it is determined whether the PWCS valid message counter exceeds a minimum threshold. In one embodiment, this threshold is 60 valid messages. Upon determining that the PWCS valid message counter does not exceed a minimum threshold, the process proceeds to reset the CWCS and the PWCS valid message counters to zero at 1351, and then proceeds to the next criteria 1322. Upon determining that the PWCS valid message counter exceeds a minimum threshold, the process proceeds to 1350, where it is determined whether the PWCS valid message counter is greater than the CWCS valid message counter by a threshold. In one embodiment, this threshold is 10%. That is, the PWCS valid threshold is 10% greater than the CWCS. Upon determining that the PWCS valid message counter is greater than a CWCS valid message counter by a threshold, the process proceeds to reset the CWCS and the PWCS valid message counters to zero at 1349, and proceeds to 1346 where the PWCS and the CWCS are swapped (the PWCS becomes the CWCS and the CWCS becomes the PWCS). Upon determining that the PWCS valid message counter is not greater than the CWCS valid message counter by a threshold, the process proceeds to reset the CWCS and the PWCS valid message counters to zero at 1351, and then proceeds to the next criteria 1322.

At 1352, a current timer variable is set to the system timer of the GPS/WAAS receiver unit. It is determined at 1354 whether the swap timer variable is greater than the current timer variable, which was set to the system timer at an earlier time, by a threshold. According to one embodiment, the threshold is ten minutes, which is approximately two times longer than the period associated with the WAAS corrections that have the slowest update rate. Upon determining that the swap timer variable is not greater than the current timer variable by a threshold, the process proceeds to 1356 where the CWCS (the currently selected satellite) is maintained as the CWCS. Upon determining that the swap timer variable is greater than the current timer variable by a threshold, the process proceeds to 1358 where the swap timer variable is set to be equal to the current timer variable. At 1360, it is determined if each presently tracked GPS satellite has valid CWCS WAAS corrections. At 1362, it is determined whether there are sufficient CWCS corrections available to complete a differential fix of the GPS/WAAS receiver unit. If no satellite presently being tracked by the GPS/WAAS receiver was determined to have valid corrections collected from the CWCS or if so few corrections have been collected from the CWCS that a differential position fix cannot be computed, the process proceeds to 1346 where the PWCS and the CWCS are swapped (the PWCS becomes the CWCS and the CWCS becomes the PWCS). If it is determined that there are sufficient CWCS corrections available to complete a differential fix of the GPS/WAAS receiver unit, the process proceeds to 1356 where the CWCS (the currently selected satellite) is maintained as the CWCS.

Figure 14:
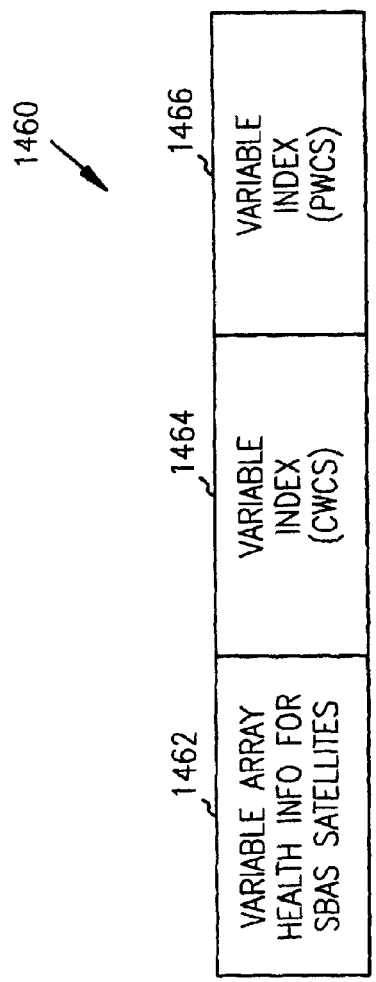
FIG. 14 is a representation of a data structure used by a GPS device in determining the satellite to be used for SBAS corrections.

FIG. 14 is a representation of a data structure used by a GPS device in determining the satellite to be used for SBAS corrections. Such a data structure 1460 is capable of being used to perform the process represented generally by 714 in FIG. 7, 1114 in FIG. 11 and 1314 in FIG. 13, for example. In one embodiment, the data structure 1460 includes a field 1462 representing a variable array of health information for 19 SBAS satellites. Although there are currently only two WAAS satellites, assignments have been provided such that 19 WAAS satellites are capable of being used. The array of health information includes ranging health information, correction health information, and broadcast integrity health information. The data structure 1460 further includes a field 1464 that represents a CWCS variable index and a field 1466 that represents a PWCS variable index that can be used to index into the array of health information.

Figure 15:
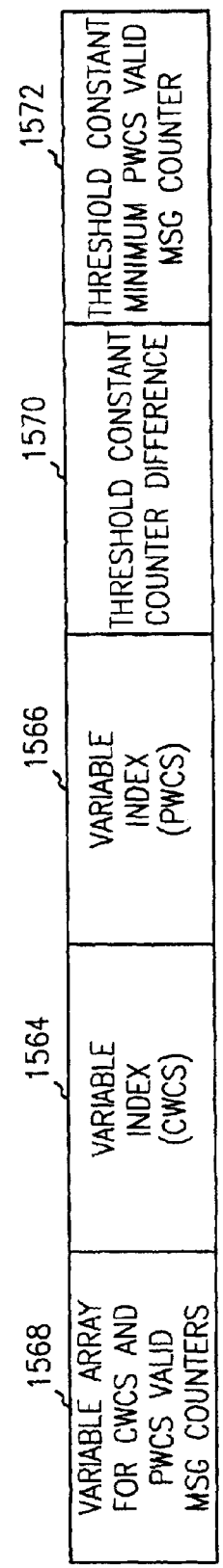
FIG. 15 is a representation of another data structure used by a GPS device in determining the satellite to be used for SBAS corrections.

FIG. 15 is a representation of another data structure used by a GPS device in determining the satellite to be used for SBAS corrections. Such a data structure 1560 is capable of being used to perform the process represented generally by 816 in FIG. 8, 916 in FIG. 9, 1116 in FIG. 11 and 1316 in FIG. 13, for example. In one embodiment, the data structure 1560 includes a field 1568 representing a variable array of two valid WAAS (or SBAS) message counters. One of the counters is a CWCS (or CSCS) valid message counter and the other is a PWCS (or PSCS) valid message counter. These valid message counters are used to monitor the reliability of the two WAAS satellites. The data structure 1560 further includes a field 1564 that represents a CWCS variable index and a field 1566 that represents a PWCS variable index that can be used to index into the array of valid message counters. The data structure 1560 further includes a field 1570 representing a threshold constant that represents the PWCS to CWCS valid message counter difference. For example, when the threshold constant is 10%, the PWCS will become the CWCS if the PWCS valid message counter is 10% larger than the CWCS valid message counter. According to one embodiment, the data structure 1560 further includes a field 1572 representing a threshold constant that represents a PWCS valid message counter minimum threshold. For example, when the PWCS valid message counter minimum threshold constant is 60, the comparisons between the CWCS and the PWCS are made only after receiving 60 PWCS valid messages.

FIGS. 16A and 16B are representations of other data structures used by a GPS device in determining the satellite to be used for SBAS corrections. Such a data structure 1660 is capable of being used to perform the process represented generally by 1022 in FIG. 10, 1122 in FIG. 11 and 1322 in FIG. 13, for example. In one embodiment, the data structure 1660 includes a field 1674 representing a variable that contains the current timer, a field 1676 that contains the swap timer, and a field 1678 representing a threshold constant that represents the current timer to swap timer difference threshold. For example, a ten minute timer difference threshold is a sufficient amount of time for the GPS/WAAS receiver device to receive even the WAAS correction data with the slowest update rate. In FIG. 16A, the data structure 1660 also includes a field 1680 representing a variable that represents whether any satellite presently tracked has valid corrections collected from the CWCS. In FIG. 16B, the data structure 1660 also includes a field 1682 representing a variable that represents a presently computed position fix type, and a field 1684 representing constants that are assigned to the presently computed positions fix type variable. In one embodiment, the data structure includes a field 1680 representing a variable that represents whether any satellite presently tracked has valid corrections collected from the CWCS, a field 1682 representing a variable that represents a presently computed position fix type, and a field 1684 representing constants that are assigned to the presently computed positions fix type variable.

The computed position fix types include: no position fix; a two-dimensional position fix with no differential corrections; a three-dimensional position fix with no differential corrections; a two-dimensional position fix with differential corrections; and a three-dimensional position fix with differential corrections. A two-dimensional position fix indicates that the GPS/WAAS receiver unit is receiving signals from three GPS satellites, and a three-dimensional position fix indicates that the GPS/WAAS receiver unit is receiving signals from four or more GPS satellites. The position fix is with differential corrections if the GPS/WAAS receiver device is receiving WAAS corrections for the GPS satellites that are being used for the position fix.

Figure 17:
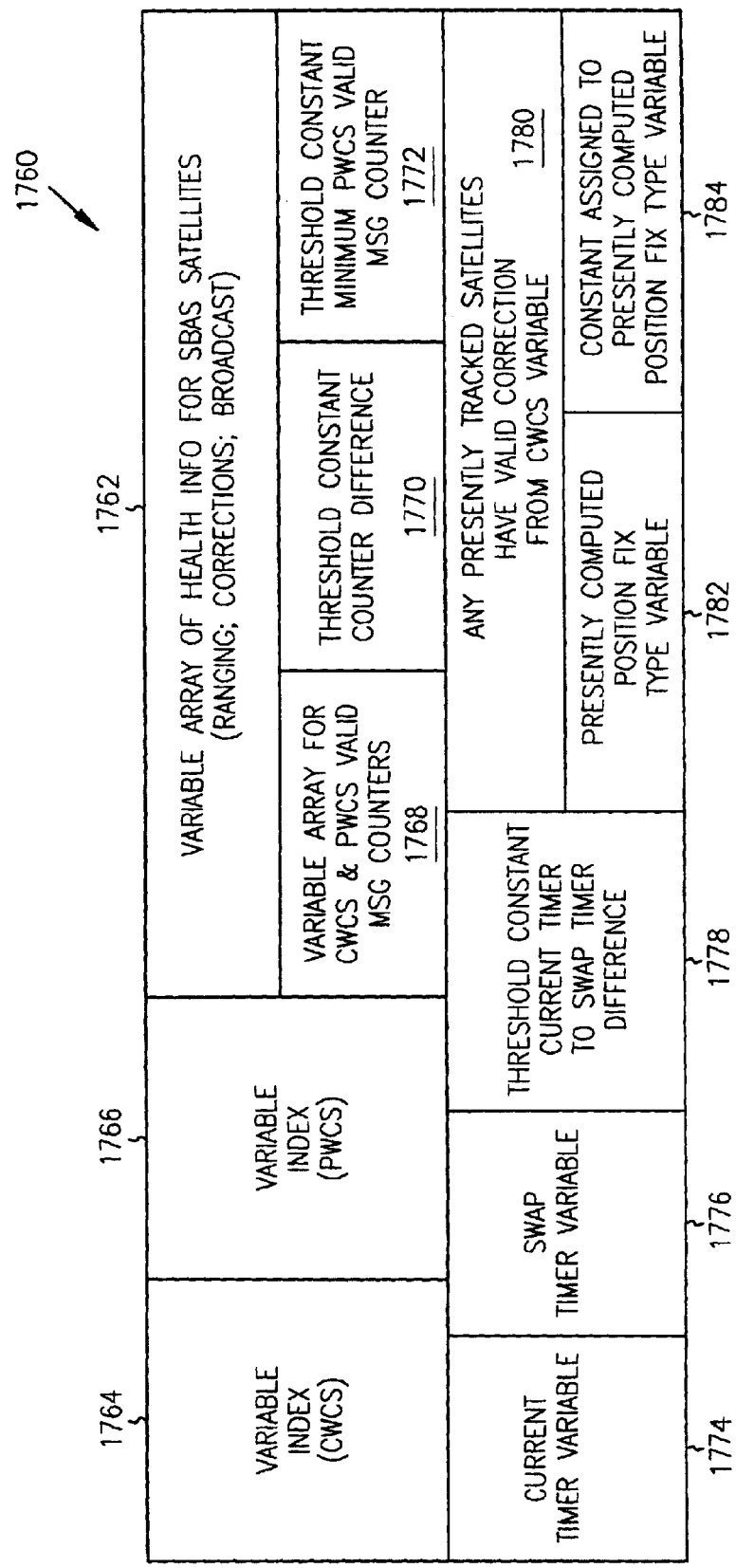
FIG. 17 is a representation of a data structure used by a GPS device in determining the satellite to be used for SBAS corrections.

FIG. 17 is a representation of a data structure used by a GPS device in determining the satellite to be used for SBAS corrections. Such a data structure 1760 is capable of being used to perform the process represented generally by 1114, 1116 and 1122 in FIG. 11 and 1314, 1316 and 1322 in FIG. 13, for example. The data structure 1760 includes all of the fields represented in FIGS. 14, 15, 16A and 16B. A description of these fields will not be repeated here. This data structure 1760 is capable of being used in a hierarchy for determining a desired corrections source. One of ordinary skill in the art will appreciate that various data structures can be created for use in the various hierarchies for determining a desired corrections source by including various combinations of the fields represented in the data structures of FIGS. 14, 15, 16A and 16B.

As one of ordinary skill in the art will understand upon reading and comprehending this disclosure, any one or more of the above features can be combined into a particular embodiment of the invention. Likewise, in the invention any one or a combination of the above functions can be optionally de-activated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal, that represents a sequence of instructions which, when executed by a processor, such as processor 512 in FIG. 5, cause the processor to perform the respective method. In other embodiments, methods provided above are implemented as a set of instructions contained on a computer-accessible medium, such as memory 516 in FIG. 5, capable of directing a processor, such as processor 512 in FIG. 5, to perform the respective method. In varying embodiments, the medium is a magnetic medium, an electronic medium, or an optical medium.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques. However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to systems, devices and methods to determine the appropriate or desired SBAS correction source. That is, the systems, devices and methods improve the accuracy, availability and integrity of GPS. The systems, devices and methods of the present invention offer various criteria, along with a hierarchy of these criteria, used in determining the appropriate or desired geographical correction source.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A method, comprising:

receiving Space Based Augmentation System (SBAS) correction messages from a selected SBAS satellite;

determining whether at least one criterion is satisfied for using the selected SBAS satellite as a correction source; and upon determining that the at least one criterion is not satisfied for using the selected SBAS satellite as a correction source, selecting a second SBAS satellite to be used as a correction source from which to receive SBAS correction messages, wherein determining whether at least one criterion is satisfied for using the selected SBAS satellite as a correction source includes determining whether the SBAS correction messages received from the selected SBAS satellite are reliable, and wherein determining whether the SBAS correction message received from the selected satellite is reliable includes:

determining whether the SBAS correction messages received from the selected satellite are less reliable than SBAS correction messages received from the second SBAS satellite; and upon determining that the SBAS correction messages received from the selected satellite are less reliable than SBAS correction messages received from a second SBAS satellite, determining whether a stability threshold is exceeded.

2. A method, comprising:

receiving Space Based Augmentation System (SBAS) correction messages from a selected SBAS satellite;

determining whether at least one criterion is satisfied for using the selected SBAS satellite as a correction source; and upon determining that the at least one criterion is not satisfied for using the selected SBAS satellite as a correction source, selecting a second SBAS satellite to be used as a correction source from which to receive SBAS correction messages, wherein determining whether at least one criterion is satisfied for using the selected SBAS satellite as a correction source includes:

determining whether the selected SBAS satellite is sending SBAS correction messages;

upon determining that the selected SBAS satellite is sending SBAS correction messages, determining whether the SBAS correction messages received from the selected SBAS satellite are reliable; and upon determining that the SBAS correction messages received from the selected SBAS satellite are reliable, determining whether a differential position can be created from the received SBAS correction messages.

3. A method in a global positioning system (GPS) for determining a Wide Area Augmentation System (WAAS) corrections source, comprising:

synchronizing to signals from at least two WAAS satellites;

selecting one WAAS satellite from which to receive WAAS correction messages;

receiving WAAS correction messages from the selected WAAS satellite;

determining whether at least one criterion is satisfied for using the selected WAAS satellite as a correction source; and upon determining that the at least one criterion is not satisfied for using the selected WAAS satellite as a correction source, selecting a second WAAS satellite to be used as a correction source from which to receive WAAS correction messages wherein determining whether at least one criterion is satisfied for using the selected WAAS satellite as a correction source includes:

determining whether the selected WAAS satellite is sending WAAS correction messages;

upon determining that the selected WAAS satellite is sending WAAS correction messages, determining whether the WAAS correction messages received from the selected WAAS satellite are reliable; and upon determining that the WAAS correction messages received from the selected WAAS satellite are reliable, determining whether a differential position can be created from the received WAAS correction message.

4. A computer-readable medium having computer-executable instructions, wherein a computer executes the instructions to:

synchronize to signals from at least two Space Based Augmentation System (SBAS) satellites;

select one SBAS satellite from which to receive correction messages;

receive correction messages from the selected SBAS satellite;

determine whether at least one criterion is satisfied for using the selected SBAS satellite as a correction source; and select a second SBAS satellite to be used as a correction source from which to receive correction messages if the at least one criterion is not satisfied for receiving correction messages from the selected SBAS satellite, wherein the computer-executable instructions adapted to determine whether at least one criterion is satisfied for using the selected SBAS satellite as a correction source include:

computer-executable instructions adapted to determine whether the selected SBAS satellite is sending SBAS correction messages;

computer-executable instructions adapted to determine whether the SBAS correction messages received from the selected SBAS satellite are reliable if it is determined that the selected SBAS satellite is sending SBAS correction messages; and computer-executable instructions adapted to determine whether a differential position can be created from the received SBAS correction messages if it is determined that the SBAS correction messages received from the selected SBAS satellite are reliable.

5. A data structure for use by a Global Positioning System (GPS) receiver device in making Space Based Augmentation System (SBAS) corrections, comprising:

a field representing a variable array for a Current SBAS Correction Source (CSCS) valid SBAS message counter and a Potential SBAS Correction Source (PSCS) valid SBAS message counter;

a field representing a CSCS variable index;

a field representing a PSCS variable index; and a field representing a threshold constant for a difference between the CSCS valid SBAS message counter and the PSCS valid SBAS message counter.

6. The data structure of claim 5, further comprising a field representing a threshold constant for a minimum PSCS valid MSG counter.

7. A data structure for use by a Global Positioning System (GPS) receiver device in making Space Based Augmentation System (SBAS) corrections, comprising:

a field representing a current timer variable;

a field representing a swap timer variable;

a field representing a threshold constant for a difference between the current timer variable and the swap timer variable; and a field representing a variable that indicates whether any presently-tracked satellite has valid corrections collected from a Current SBAS Correction Source (CSCS).

8. The data structure of claim 7, further comprising:

a field representing a variable that indicates a presently-computed position fix type; and a field representing a constant assigned to the presently-computed position fix type variable.

9. A data structure for use by a Global Positioning System (GPS) receiver device in making Space Based Augmentation System (SBAS) corrections, comprising:

a field representing a current timer variable;

a field representing a swap timer variable;

a field representing a threshold constant for a difference between the current timer variable and the swap timer variable;

a field representing a variable that indicates a presently-computed position fix type; and a field representing a constant assigned to the presently-computed position fix type variable.

10. The data structure of claim 9, further comprising a field representing a variable that indicates whether any presently-tracked satellite has valid corrections collected from a Current SBAS Correction Source (CSCS).

11. A data structure for use by a Global Positioning System (GPS) receiver device in making Space Based Augmentation System (SBAS) corrections, comprising:

a field representing a Current SBAS Correction Source (CSCS) variable index;

a field representing a Potential SBAS Correction Source (PSCS) variable index a field representing a variable array of health information for SBAS satellites;

a field representing a variable array for a CSCS valid SBAS message counter and a PSCS valid SBAS message counter;

a field representing a threshold constant for a difference between the CSCS valid SBAS message counter and the PSCS valid SBAS message counter;

a field representing a threshold constant for a minimum PSCS valid message counter;

a field representing a current timer variable;

a field representing a swap timer variable;

a field representing a threshold constant for a difference between the current timer variable and the swap timer variable;

a field representing a variable that indicates whether any presently-tracked satellite has valid corrections collected from a CSCS;

a field representing a variable that indicates a presently-computed position fix type; and a field representing a constant assigned to the presently-computed position fix type variable.

* * * * *